Dec. 3, 1929.  L. EMANUELI  1,737,650
PROCESS FOR JOINTING SPLICING AND IMPREGNATING ELECTRIC CABLES
Filed Aug. 15, 1927

Inventor:
Luigi Emanueli
By Emil Bönnelycke
Attorney

Patented Dec. 3, 1929

1,737,650

UNITED STATES PATENT OFFICE

LUIGI EMANUELI, OF MILAN, ITALY, ASSIGNOR TO SOCIETÁ ITALIANA PIRELLI, OF MILANO, ITALY

PROCESS FOR JOINTING, SPLICING, AND IMPREGNATING ELECTRIC CABLES

Application filed August 15, 1927, Serial No. 213,175, and in Italy August 31, 1926.

The present invention refers to high tension electric cables with impregnated paper insulation and having longitudinal ducts or cavities filled with oil under pressure.

The impregnation of said cables is begun first in the factory, then completed during the laying-out of the cable. Now in most cases the cable cannot be laid horizontally in its entirety, nor can it be laid with a constant inclination, but on account of local obstacles, crossings or the like, must be laid along a frequently rising and falling line with lengths at different levels under the ground. This causes many serious difficulties in the impregnation operations during the lay-out, on account of the impossibility of obtaining high vacua in points of the cable far away from the vacuum pump.

Figure 1:
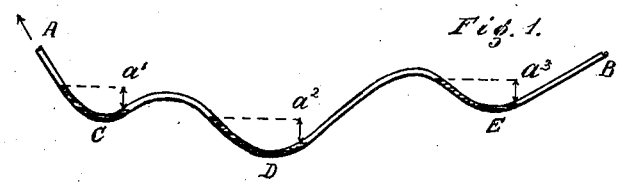

In the accompanying drawing, Figure 1 is a diagrammatic view of a cable laid along a rising and falling line; and Figs. 2 to 7 are views showing the successive stages in forming the joint between two lengths of the cables.

As explanatory of the difficulties experienced in connection with the impregnation operations, and referring to the diagram of Fig. 1, it will be observed that in the portion A B of the cable there are points C, D, E of considerable sag in which the oil introduced into the core of the cable during the preliminary impregnation at the factory will collect, so that when the vacuum pump is set in action, say at the end A of the cable, keeping the end B closed, differences in the oil level will arise as indicated at $a_1$, $a_2$, $a_3$ whose sum in oil-column-weight amounts to the minimum value of the pressure which may be found in end B when in end A a perfect vacuum is obtained. This cannot be avoided simply by placing a pump also at the end B of the cable, when the line representing the cable has many undulations.

The necessity may therefore arise of connecting additional vacuum pumps at intermediate points of the cable, where joints come between the single subsequent lengths of the cable.

Such a problem is not an easy one to solve, as the joints used in such cases are generally made by dressing the two tubular conductor cores, soldered together, with impregnated paper tape until an insulation similar to that of the cable and even somewhat greater is obtained: such joints evidently do not allow, after their completion, a high vacuum in the inside of the main to be obtained by applying a suction on the outside surface of the insulating layers.

The problem, in the case of the lay-out of oil-filled hollow mains, is solved by means of the present invention, according to which the joint between two lengths of cable is made in two successive stages.

First the two hollow conductor-cores are jointed by means of a metallic ferrule provided with a lateral hole to be plugged later; this partial joint is enclosed in a temporary sleeve, and to which latter a vacuum-pump is connected as well as to both ends of the main. Having obtained a high vacuum at every point of said main, its impregnation with oil is made in the usual way, beginning at both ends of the main; the oil will flow out of the ferrule from the hole in it into the sleeve, filling the same. Then a suitable pressure is applied to the oil contained in the whole main, the sleeve is opened and the hole in the ferrule plugged, thus stopping any further outflow of oil from the tubular core. In a subsequent operation the joint is completed, first lapping it with impregnated insulating tape, then dressing and enclosing the same in a permanent joint-box also filled with oil.

This special type of joint and the above described operations are better disclosed in Figs. 2, 3, 4, 5, 6, 7 which show the successive stages.

Figure 2:

Fig. 2 shows the ends of two cable sections to be jointed, in which 1 are the conductor-cores and 2 the lead sheathing.

Figure 3:
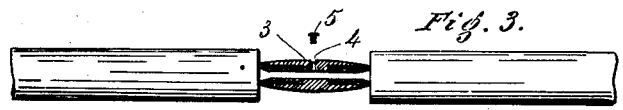

Fig. 3 shows in longitudinal section the metallic ferrule 3 provided with a tapped hole 4 to be plugged with screw 5, which ferrule is sweated on the core ends.

Figure 4:
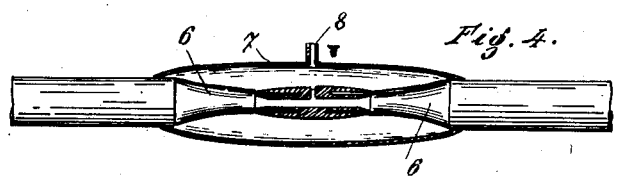

In Fig. 4 a part of the insulation 6 of each cable and its lead sheathing is cut away, and the insulation is shaped to form a conical or tapering end: the temporary sleeve 7 is then applied and soldered to the edges of the lead sheathings: the same is provded with a short pipe 8 which connects to the vacuum pump.

The pump is kept going until the oil in the hollow core flows out of hole 4 and fills the sleeve.

Figure 5:
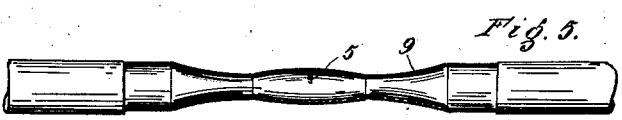

In Fig. 5 the temporary sleeve has been removed and the lead sheathing cut further back; hole 4 has been plugged with screw 5 and subsequently sweated with a little solder and the scraped conical ends of both cables and the ferrule are lapped with a layer 9 of suitable insulating waterproof compound, for instance "Sterling" tape.

Figure 6:

In Fig. 6 the joint is shown as dressed with impregnated paper-tape 10 to a proper size, according to the well known standards.

Figure 7:
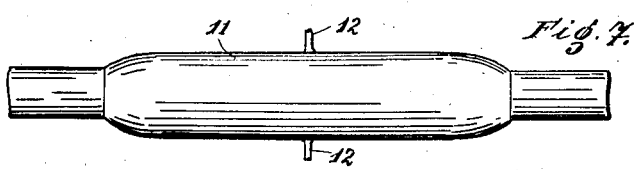

In Fig. 7 the joint is enclosed in the permanent joint-box 11, sweated at both ends to the lead sheathings; said box being provided with two short pipes 12, 12, one of which is applied to a vacuum pump whilst through the other oil is forced in to impregnate the lapping and to fill up the joint-box.

During this last stage of air extraction it is advisable to obtain a sudden drop in pressure and not a gradual one along the surface dividing the cable insulation and the joint insulation, so as to prevent air from remaining imprisoned in the joint insulation and to secure a higher vacuum before impregnation.

The waterproof insulating lapping 9, shown in Fig. 5, has the special feature of resisting to a certain difference in pressure on its two faces, preventing the oil under pressure contained in the tubular cores from flowing out towards the insulating paper-tape wrapping of the joint when vacuum is applied to the latter during its impregnation.

Naturally both the design of the joint and the manner of making it and the succession of treatments during the impregnation can vary within the limits of the appended claims.

What I claim is:

1. A process of impregnating multi-sectional, high-tension electric cables of the type having oil-filled cavities, comprising the steps of applying suction to both ends of the cable at the same time as well as to the intermediate joints between the several sections so as to obtain a high vacuum throughout the entire length of cable; and introducing oil into the cable and the interior of the joints, and thereby impregnating the entire length of cable at a single operation.

2. A process of impregnating multi-sectional, high-tension electric cables of the type having oil-filled cavities, comprising the steps of jointing the ends of the conductors of adjacent sections by apertured tubular elements; enclosing the joints in temporary casings; applying suction to both ends of the cable at the same time as well as to said casings so as to obtain a high vacuum through the entire length of cable; and introducing oil into the cable and the interior of the joints, and thereby impregnating the entire length of cable at a single operation.

3. A process of impregnating multi-sectional, high-tension electric cables of the type having oil-filled cavities, comprising the steps of jointing the ends of the conductors of adjacent sections by apertured tubular elements; enclosing the joints in temporary casings; applying suction to both ends of the cable at the same time as well as to said casings so as to obtain a high vacuum throughout the entire length of cable; introducing oil into the cable and the interior of the joints; opening the temporary casings; plugging the apertures in the jointing tubes; applying layers of insulation around the joints; and enclosing the joints in permanent joint-boxes.

4. A process of impregnating multi-sectional, high-tension electric cables of the type having oil-filled cavities, comprising the steps of jointing the ends of the conductors of adjacent sections by apertured tubular elements; enclosing the joints in temporary casings; applying suction to both ends of the cable at the same time as well as to said casings so as to obtain a high vacuum throughout the entire length of cable; introducing oil into the cable and the interior of the joints to fill both the cable and the joints completely; applying pressure at both ends of the cable; opening the temporary casings; plugging the apertures in the jointing tubes; applying to the jointing tubes and the adjacent portions of the insulation of the conductors a thin layer of insulation which is impermeable to the oil; then applying layers of insulation around the joints; enclosing the joints in permanent joint-boxes; and filling said boxes with oil.

5. A process of impregnating multi-sectional, high-tension electric cables of the type having internal oil-filled cavities, comprising the steps of jointing the ends of the conductors of adjacent sections; applying suction to both ends of the cable at the same time as well as to the joints between the conductor ends so as to obtain a high vacuum throughout the entire length of cable; and introducing oil into the cable and the interior of the joints, thereby to impregnate the entire length of cable at a single operation.

In testimony whereof I affix my signature.

LUIGI EMANUELI.